Oct. 13, 1970

G. S. EVANS 3,534,212

FLOURESCENT LAMP HAVING AN INTEGRAL MERCURY-VAPOR
PRESSURE CONTROL ASSEMBLY WITH SEGMENTED
AMALGAM-FORMING METAL

Filed Feb. 3, 1966

INVENTOR
George S. Evans
BY
D. S. Buleza
AGENT

United States Patent Office 3,534,212
Patented Oct. 13, 1970

3,534,212
FLUORESCENT LAMP HAVING AN INTEGRAL MERCURY-VAPOR PRESSURE CONTROL ASSEMBLY WITH SEGMENTED AMALGAM-FORMING METAL
George S. Evans, Caldwell, N.J., assignor to Westinghouse Electric Corporation, Pittsburgh, Pa., a corporation of Pennsylvania
Filed Feb. 3, 1966, Ser. No. 524,898
Int. Cl. H01j 61/24
U.S. Cl. 313—174            13 Claims

ABSTRACT OF THE DISCLOSURE

The mercury-vapor pressure within a fluorescent lamp or similar electric discharge device is regulated by an amalgam-forming material that is retained at a selected location within the lamp by a foraminous member. The amalgam-forming material is divided into segments that are spaced from one another on the foraminous member to inhibit the migration of fluid amalgam during the operation of the lamp. The foraminous member is preferably made of wire mesh that has thermal and physical properties which enhance its amalgam-retaining ability.

---

This invention relates to electric discharge devices and has particular reference to an improved assembly for controlling the mercury-vapor pressure within a fluorescent lamp by means of an amalgam-forming metal.

As is well known, the mercury-vapor pressure within a fluorescent lamp must be maintained within prescribed limits during operation in order to achieve optimum light output. The proper regulation of the mercury-vapor pressure becomes progressively more difficult as the operating temperature of the lamp increases and is thus a very critical design factor in so-called "highly-loaded" fluorescent lamps now being marketed, and in fluorescent lamps of conventional loading which are employed in enclosed fixtures.

The desired degree of control can be obtained by placing a predetermined amount of a metal, such as indium, within the lamp at a location where it will combine with the mercury and form an amalgam which operates at a preselected temperature when the lamp is energized. Since the mercury-vapor pressure above such an amalgam is lower than that above liquid mercury at the same temperature, the amalgam is able to retain control of the mercury-vapor pressure over a much wider temperature range than the condensed pool of mercury employed in conventional fluorescent lamps.

It has been found that the amalgam-forming metal can be readily incorporated into the lamp structure by pressing it between two pieces of foraminous material, such as wire mesh, and then bending the resulting composite lamination into a collar which is slipped around one of the lamp stems. A control assembly and a fluorescent lamp utilizing this construction are disclosed and claimed in copending application Ser. No. 381,503 entitled "Mercury Vapor Discharge Lamp and Pressure Regulating Means Therefor," filed July 9, 1964 by the present inventor and assigned to the same assignee as the present application.

Experimental pilot runs of lamps provided with such laminated collar assemblies revealed that the amalgam-forming metal melted during the sealing-in operation and that occasionally some of the molten metal dropped off the collar while the lamp was being fabricated. This leakage problem was solved by coating the ends of the collar with a substance which the metal or amalgam does not readily wet, or, alternatively, by providing a margin or border around the periphery of the collar that is devoid of amalgam-forming metal. An improved vapor-control assembly of this type is disclosed and claimed in application Ser. No. 524,907 of George S. Evans, the present inventor, which application is filed concurrently herewith and is assigned to the same assignee as the present application.

Life tests conducted on fluorescent lamps provided with the aforesaid "leak-proof" collar assemblies revealed another problem which arose as the lamps were burned. This problem came to light when it was noted that lamps fitted with mesh-collar assemblies impregnated with indium and burned in the usual horizontal position frequently developed mercury-vapor pressures that exceeded the optimum pressure. Further investigation indicated that this was caused by the movement of the amalgam from its initial uniform distribution within the cellular structure of the mesh collar assembly toward the top of the collar and the edge thereof closest to the cathode. For some unknown reason, the amalgam tends to move in the direction of higher temperatures and thus accumulates at the top of the collar as the lamp continues to burn and finally flows over the edge of the collar onto the glass stem tube. Once it wets the stem tube, it flows relatively rapidly over the glass surface toward the cathode, thus draining amalgam out of the collar assembly to the extent that in some cases the collar becomes substantially emptied of amalgam.

While the aforementioned amalgam migration does not cause the lamps to fail violently, the amalgam operates at progressively higher temperatures as it approaches the cathode. The amalgam thus gradually loses control of the mercury-vapor pressure and the lamp eventually functions as a conventional lamp in which a condensed pool of mercury serves as the control center. While the exact reason for this amalgam migration or transport phenomenon is unknown at the present time, it constitutes a serious obstacle as regards the marketing and commercial acceptance of fluorescent lamps utilizing amalgam-type vapor-pressure control means.

It is, accordingly, the general object of the present invention to overcome the aforesaid and other difficulties associated with the construction and use of such amalgam-type vapor-pressure control assemblies in mercury discharge devices.

Another and more specific object is the provision of an electric discharge lamp that has an improved mercury-vapor pressure control assembly of the above-mentioned type which can be readily incorporated into the lamp and will inhibit the migration of the amalgam, even after prolonged periods of burning.

A further object is the provision of a fluorescent lamp having a mount which is fitted with a mercury-vapor control assembly that contains an amalgam-forming metal and will retain such metal, and the subsequently formed amalgam, at the desired location on the mount when the aforesaid materials are in a liquid state.

The foregoing objects, and other advantages which will become apparent as the description proceeds, are achieved in accordance with the present invention by dividing the amalgam-forming metal that is placed in the pressure-control assembly into a plurality of discrete segments, and by fabricating the mesh components of the assembly from preselected materials. In accordance with a preferred embodiment, two pieces of wire mesh are impregnated with indium and bonded to a strip of wire mesh that is fabricated from a selected metal, such as copper, that is a good conductor of heat. Migration of the indium during the fabrication and subsequent operation of the lamp is inhibited by providing an indium-free gap across the center of the assembly and an indium-free border around the periphery of the assembly, and by oxidizing the exposed surface of the wire mesh that constitutes the outer face of the collar into which the laminated assembly is formed.

Other embodiments are also provided which further improve the thermal and amalgam-retaining properties of the laminated collar assembly by utilizing additionl components, such as a copper sheet, or using heavier gauge wire in the mesh that is impregnated with the amalgam-forming metal.

A better understanding of the invention will be obtained by referring to the accompanying drawings, wherein.

While the present invention can be utilized with advantage in various types of electric discharge devices which require means for controlling the vapor pressure of a selected metal or additive, it is especially adapted for use in conjunction with fluorescent lamps and has accordingly been so illustrated and will be so described.

EMBODIMENT I

Figure 1:
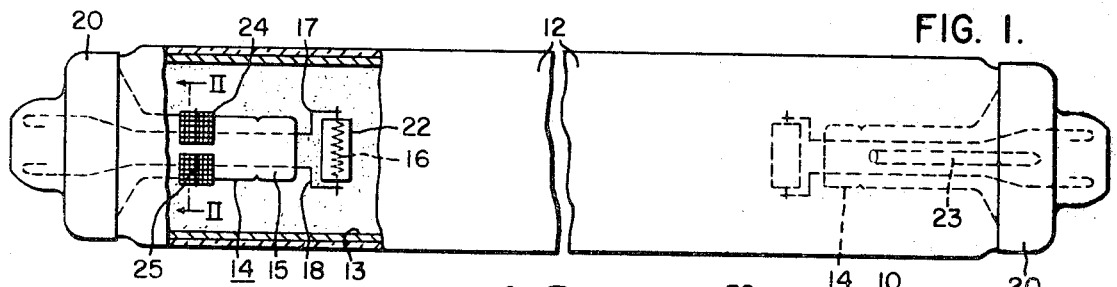
FIG. 1 is an elevational fragmentary view of a fluorescent lamp incorporating the improved mercury-vapor control assembly of the present invention, a portion of the lamp envelope being removed for purposes of illustration.

With specific reference now to the drawings, in FIG. 1 there is shown a fluorescent lamp 10 comprising a tubular vitreous envelope 12 having the customary mount 14 sealed into each of its ends. Each of the mounts include the usual vitreous stem tube 15 and a suitable cathode 16 that is attached to a pair of lead wires 17–18 sealed through the stem and connected to the terminals of a base member 20 attached to each end of the envelope 12. The cathode 16 consists of a tungsten wire coil that is coated with electron-emission material and disposed between a pair of enlarged anodes 22 attached to the lead wires. One of the mounts 14 is provided with a tubulation 23 which is tipped off after the lamp has been exhausted, dosed with mercury and filled with a suitable starting gas such as argon or neon, or a mixture thereof. The inner surface of the envelope 12 is coated with the customary coating 13 of ultraviolet-responsive phosphor.

Regulation of the mercury-vapor pressure within the lamp 10 during operation is achieved by means of a laminated assembly 24 that is formed into an annular ring or collar and secured in encircling relationship with the stem tube 15 at a predetermined distance from the cathode 16 by means of a resilient wire spring clip 25. The collar assembly 24 includes a predetermined quantity of a relatively soft metal, such as indium or the like, that has an affinity for mercury and combines with mercury molecules to form an amalgam. The manner in which the amalgam-forming material coacts with the mercury to provide the desired regulation of the mercury-vapor pressure over a wide range of ambient temperatures, and the relationship between the size of the lamp and quantity of such material required etc., are disclosed in detail in the aforementioned copending application Ser. No. 381,503.

The present invention is directed to improvements in the construction of the laminated collar assembly and these will now be described.

Figure 2:
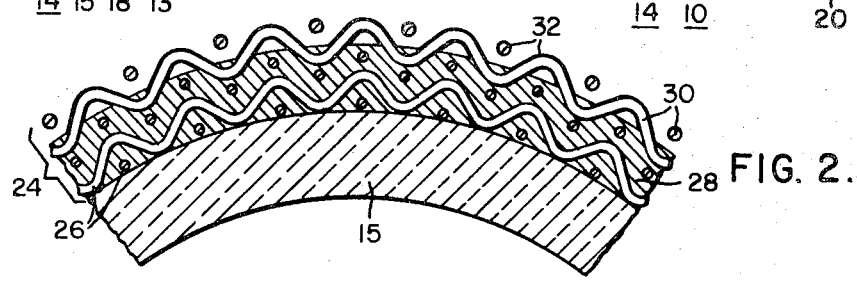
FIG. 2 is an enlarged cross-sectional view of a portion of the lamp stem and the associated collar assembly, taken along the line II—II of FIG. 1 in the direction of the arrows.

According to the embodiment of the present invention illustrated in FIG. 2, the collar 24 comprises an inner strip 26 of wire mesh that is substantially entirely embedded in a strip 28 of indium or other suitable amalgam-forming material, and the resulting impregnated mesh is bonded to another strip 30 of wire mesh to form a composite laminated structure. As shown, the indium strip 28 and wire mesh member 26 embedded therein form the inner surface of the collar 24 and are in direct contact with the stem tube 15, whereas the second wire mesh strip 30 is only partly embedded in the layer of indium and constitutes the outer surface of the collar.

In order to quickly and uniformly distribute the heat absorbed by the collar 24 when the lamp 10 is energized and thus enable the collar to operate at a temperature as uniform as possible, the aforesaid wire mesh members 26 and 30 are preferably fabricated from a material that is a good conductor of heat. Preferably, these members are made from a material that has a higher coefficient of thermal conductivity than tantalum. Suitable materials are copper, silver, aluminum, gold, nickel, tungsten, molybdenum, and alloys of these metals. From a cost standpoint, copper is preferred and has produced excellent results since it materially reduces the temperature differential that would otherwise exist between the top and bottom portions of the collar 24 when the lamp 10 is operated in a horizontal position. This, in turn, inhibits the migration of the amalgam toward the top of the collar.

A combination of materials which is particularly adapted for this application is an outer wire mesh of copper and an inner wire mesh of nickel-plated copper since the entire assembly per se is a good heat conductor and the inner component has a surface which is readily wet by the amalgam. The assembly thus has thermal and physical properties which inherently provide the uniform distribution of heat and the amalgam-retaining ability necessary to inhibit the migration of the fluid amalgam.

The migration of the molten amalgam to the outer surface of the collar 24 is inhibited in accordance with one aspect of the invention by coating the exposed outwardly-disposed surfaces of the wire mesh member 30 with a substance 32 (see FIG. 2) that the amalgam does not readily wet. Good results have been obtained by fabricating the outer mesh member 30 from copper wire and coating the aforesaid exposed portions thereof with copper oxide. This combination is particularly advantageous insofar as it has been found that a layer of copper oxide is automatically formed on such exposed portions of the copper mesh during the sealing-in and exhaust-bake operations required to fabricate the lamp.

Figure 3:
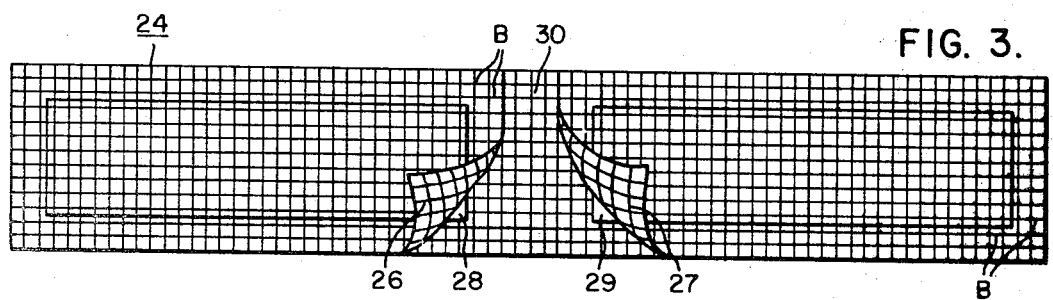
FIGS. 3 and 4 are plan and side views, respectively, of one form of laminated vapor-control assembly before it is bent into arcuate shape.
Figure 4:
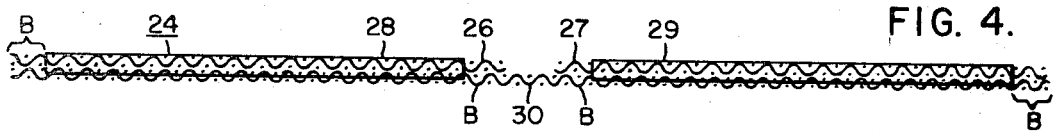
Figure 5:
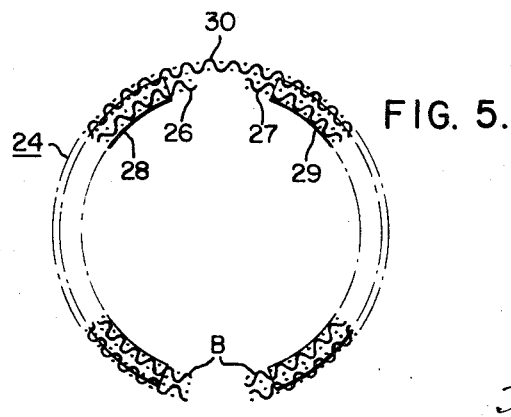
FIG. 5 is an end view of the assembly shown in FIGS. 3 and 4 after it has been bent into a collar and is ready to be mounted on the stem tube.

As is illustrated in FIGS. 3 to 5, which are views of various phases in the manufacture of the collar 24 shown in FIGS. 1 and 2, migration of the amalgam is also inhibited by dividing the amalgam-forming metal 28 (hereinafter referred to as "indium" for convenience) into two discrete segments 28 and 29 which are spaced one from another within the assembly. In this particular embodiment, the inner component of the assembly comprises two rectangular pieces of wire mesh 26 and 27 the medial portions whereof are embedded in smaller rectangular-shaped indium strips 28 and 29, as best shown in FIGS. 3 and 4. These indium-impregnated strips are, in turn, bonded to and held in spaced-apart relation by a longer rectangular strip 30 of wire mesh that forms the outer surface of the assembly 24.

As will be noted in FIG. 3, the indium strips 28 and 29 are centrally located with respect to the wire mesh strips 26 and 27, and the latter have their side and end edges substantially aligned with the corresponding edges of the outer mesh strip 30. This provides an indium-free margin or border B of overlapping wire mesh that completely encircles the segmented and spaced indium strips 28 and 29, Also, the combined lengths of the inner mesh strips 26 and 27 is less than the length of the outer mesh strip 30 so that the central portion of the completed lamination 24 consists of the single layer of outer mesh 30, as best shown in FIG. 4.

The above-described composite lamination 24, when bent into the form of a collar as shown in FIG. 5, provides a structure in which the indium-impregnated wire-mesh strips 26 and 27 form the inner surface of the collar and are held in end-to-end peripherally-extending relationship by the continuous wire-mesh strip 30, which forms the outer surface of the collar.

EMBODIMENT II

Figure 6:
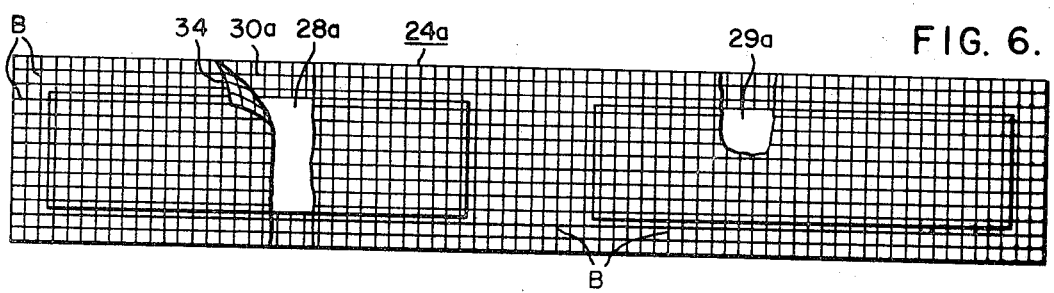
FIGS. 6 to 8 are similar views of an alternative embodiment.
Figure 7:
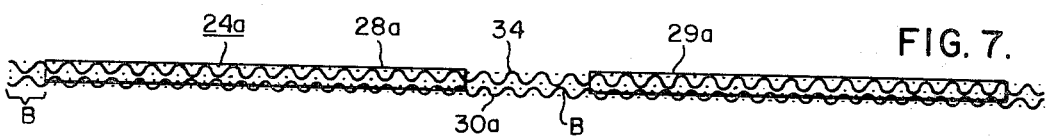
Figure 8:
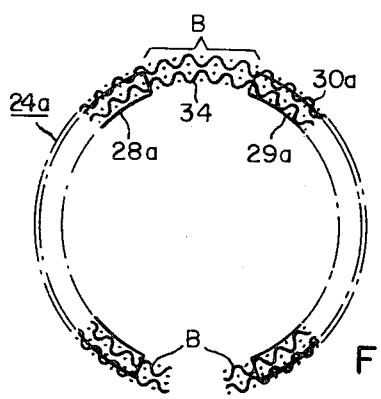

In FIGS. 6 to 8 there is shown a slightly modified pressure-control assembly 24a wherein the segmented indium strips 28a and 29a are sandwiched between an inner wire-mesh strip 34 that is of the same size and configuration as the outer wire-mesh strip 30a. As is illustrated most clearly in FIGS. 7 and 8, the central portion of the final lamination 24a, and the collar made therefrom, consists in this case of the overlying portions of both strips of wire mesh that are devoid of indium. Thus, the indium-free border B (as indicated in FIGS. 6 to 8) extends completely across the central portion of the collar as well as around its periphery.

EMBODIMENT III

Figure 9:
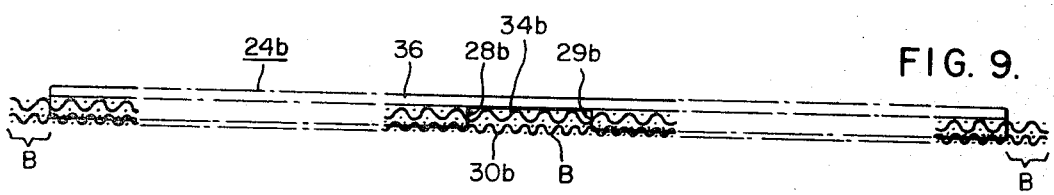
FIGS. 9 and 10 are side and end views of still another embodiment.

In FIG. 9 there is shown another form of assembly 24b in which the rectangular indium strips 28b and 29b are embedded in a continuous strip 34b of wire mesh to form a core, so to speak, that is sandwiched between a second strip of wire mesh 30b and a sheet 36 of copper, or similar material that has a high thermal conductivity coefficient. The copper sheet 36 and strips of wire mesh 30b and 34b are of substantially the same width, and the wire mesh strips are also of the same length and disposed in overlapping aligned relationship. The copper sheet, however, is slightly shorter than the mesh strips and disposed so that its ends are in substantial alignment with the end of the indium strips 28b and 29b, as shown in FIG. 9. This arrangement provides overlapping portions of mesh at each end of the assembly 24b that are devoid of indium and thus constitute migration-inhibiting borders B. These borders merge with indium-free borders that extend along the sides and central portion of the assembly in the same manner as in the previously-described embodiments.

Figure 11:
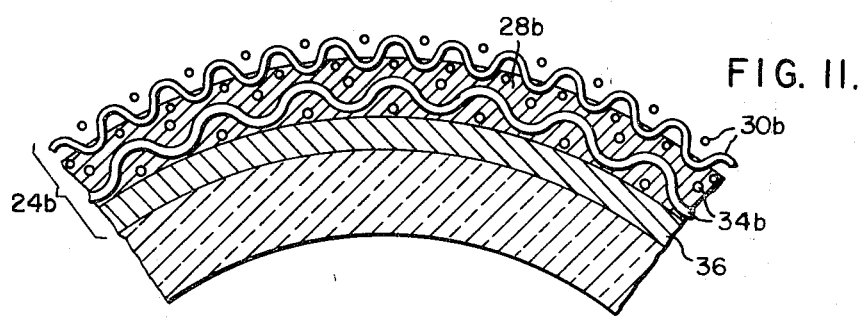
FIG. 11 is an enlarged cross-sectional view of a portion of a lamp stem fitted with a vapor-control assembly of the type shown in FIGS. 9 and 10.
Figure 10:
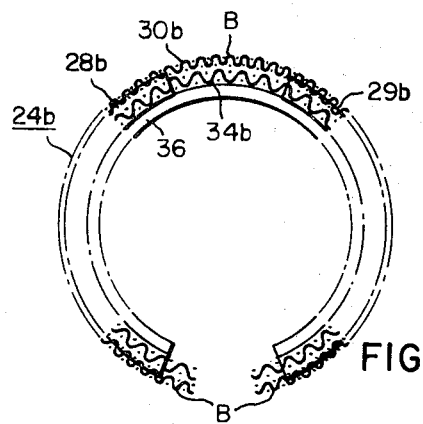

When the lamination 24b is bent into a collar, as shown in FIG. 10, the copper sheet 36 constitutes the inner face of the collar and the strip 30b of wire mesh its outer face. Hence, when the collar is subsequently attached to the stem tube 15, the sheet 36 of highly heat-conductive metal (as illustrated in FIG. 11) is seated against the glass stem and insures that all parts of the collar operate at substantially the same temperature. To this end, the inner wire-mesh member 34b which is embedded in the indium strips 28b and 29b is also fabricated from heavier wire (that is, wire of larger diameter) than that utilized in the outwardly-disposed wire mesh strip 30b.

Comparative life tests of lamps and analysis of the amalgam collars after various periods of burning have indicated that the initial composition of the amalgam-forming metal may play a role in the ability or tendency of the amalgam to migrate during the life of the lamp. For example, it has been found that fluorescent lamps made with 80 atomic percent indium amalgam show no sign of amalgam accumulation or migration after over 4000 hours of operation as compard to the degree of amalgam migration exhibited after only 2000 hours of burning by lamps made with 90 atomic percent indium on a similar collar assembly. Since the high-indium content amalgams are stiff and hard and contain many crystalline-like fibers, it is theorized that the formation and growth of amalgam crystals triggers the migration phenomenon or increases the rate at which the amalgam creeps out of the collar toward the stem and cathode. The amalgam-forming metal, accordingly, need not be composed of a single metal such as indium, thallium, etc. but may comprise an alloy of two or more such metals, such as indium and tin for example. A suitable multicomponent amalgam-forming material of this type is an alloy consisting of approximately 90 percent by weight indium and 10 percent by weight of tin.

It will be appreciated from the foregoing that the objects of the invntion have been achieved in that an improved mercury-vapor pressure control assembly has been provided which can be readily fabricated and not only effectivly inhibits the tendency of the amalgam to migrate during lamp operation but prevents the molten amalgam-forming material from leaking out of the assembly during the sealing-in and other operations required to fabricate the lamp.

While several embodiments have been illustrated and described in accordance with the patent statutes, various changes in the construction, arrangement and composition of the various components employed in the assembly can be made without departing from the spirit and scope of the invention.

I claim as my invention:

1. In an electric discharge lamp that contains an ionizable medium which includes mercury, a mercury-vapor pressure control assembly comprising, in combination:
   a foraminous member located within said lamp,
   a material that combines with mercury to form an amalgam and is disposed on said foraminous member and
   divided into a plurality of discrete segments that are spaced one from another, and
   means engaging said segments of amalgam-forming material and retaining them in place on said foraminous member.

2. The lamp set forth in claim 1 wherein said segments of amalgam-forming material are also spaced from the proximate edges of said foraminous member and are thus each surrounded by portions of said member that are devoid of amalgam-forming material.

3. The lamp set forth in claim 1 wherein:
   said foraminous member comprises a piece of wire mesh that is partly embedded in said segments of amalgam-forming material,
   said segments are located on the same side of said piece of wire mesh, and the exposed outwardly-disposed portions of the other side of said wire mesh is coated with an oxide of the metal from which the mesh is fabricated.

4. The lamp set forth in claim 1 wherein said foraminous member is fabricated from a metal that has a coefficient of thermal conductivity higher than that of tantalum.

5. The lamp set forth in claim 1 wherein said foraminous member comprises a piece of wire mesh that is fabricated from a metal selected from the group consisting of copper, aluminum, silver, nickel, tungsten, molybdenum, and alloys thereof.

6. The lamp set forth in claim 1 wherein;
   the segments of said amalgam-forming material comprise strips of such material,
   said foraminous member comprises a piece of wire mesh that is partly embedded in said strips of amalgam-forming material, and
   said retaining means comprises a second piece of wire mesh that is substantially entirely embedded in said strips of amalgam-forming material and extends beyond the peripheral edges thereof.

7. The lamp set forth in claim 1 wherein;
   said foraminous member comprises a first piece of wire mesh that overlies and is partly embedded in said segments of amalgam-forming material,
   said retaining means comprises a second piece of wire mesh that is substantially entirely embedded in said segments of amalgam-forming material, and the wire from which said second piece of mesh is fabricated has a diameter large than the wire comprising said first piece of mesh.

8. The lamp set forth in claim 1 wherein;
the segments of said amalgam-forming material comprises strips of said material,
said foraminous member comprises a strip of wire mesh, and
said retaining means comprises a plurality of wire mesh strips equal in number to the strips of said amalgam-forming material,
said wire mesh strips being substantially entirely embedded in the respective strips of amalgam-forming material and extending therebeyond,
the dimensions and orientation of said embedded wire mesh strips being such that they are spaced from one another.

9. In a fluorescent lamp having a vitreous envelope, the combination of;
a vitreous stem that is sealed to an end of said envelope, and
an annular mercury-vapor pressure control assembly that is disposed in encircling relationship with and located at a predetermined position on said stem,
said annular vapor-control assembly comprising the following components arranged in laminated relationship;
(1) a pair of elongated strips of a relatively-soft metallic material that has an affinity for and combines with mercury to form an amalgam, said strips of amalgam-forming material being disposed in end-to-end spaced-apart relationship and extending around said annular assembly,
(2) a pair of elongated strips of wire mesh embedded in and extending beyond the peripheral edges of the respective strips of amalgam-forming material, said conjoined strips of wire mesh and amalgam-forming material constituting the inner face of said annular assembly and thus being in contact with the vitreous stem, and
(3) a third elongated strip of wire mesh overlying said embedded strips of amalgam-forming material and extending beyond the peripheral edges thereof, said third strip being in contact with said amalgam-forming material and having its side and end edges in substantial alignment with the side and terminal edges of said pair of wire mesh strips so that said strips of amalgam-forming material are completely encircled by overlapping regions of the respective wire mesh strips that are devoid of such material.

10. The combination set forth in claim 9 wherein a sheet of copper is interposed between said vitreous stem and the annular mercury-vapor control assembly.

11. The combination set forth in claim 9 wherein;
said amalgam-forming material comprises indium,
said third strip of wire mesh is fabricated from copper, and
the outwardly-disposed surface of said copper mesh strip is coated with a layer of copper oxide.

12. The combination as set forth in claim 9 wherein said amalgam-forming material comprises an alloy of indium and tin.

13. The lamp set forth in claim 1 wherein:
said retaining means comprises a piece of nickel-plated copper wire mesh, and
said foraminous member comprises a wire mesh member that is fabricated from copper.

References Cited

UNITED STATES PATENTS

| | | | |
|---|---|---|---|
| 2,077,961 | 4/1937 | Smith | 313—179 |
| 2,404,803 | 7/1946 | Stafford | 206—0.4 |
| 3,007,071 | 10/1961 | Lompe et al. | 313—109 |
| 3,152,278 | 10/1964 | Dziergwa et al. | 313—109 |
| 3,187,885 | 6/1965 | Housen et al. | 206—0.4 |

RAYMOND F. HOSSFELD, Primary Examiner

U.S. Cl. X.R.

206—0.4; 313—178